No. 735,475. PATENTED AUG. 4, 1903.
W. D. & R. W. DENTON.
MOUNT FOR ENTOMOLOGICAL, BOTANICAL, AND NATURAL HISTORY SPECIMENS.
APPLICATION FILED MAY 18, 1903.
NO MODEL.
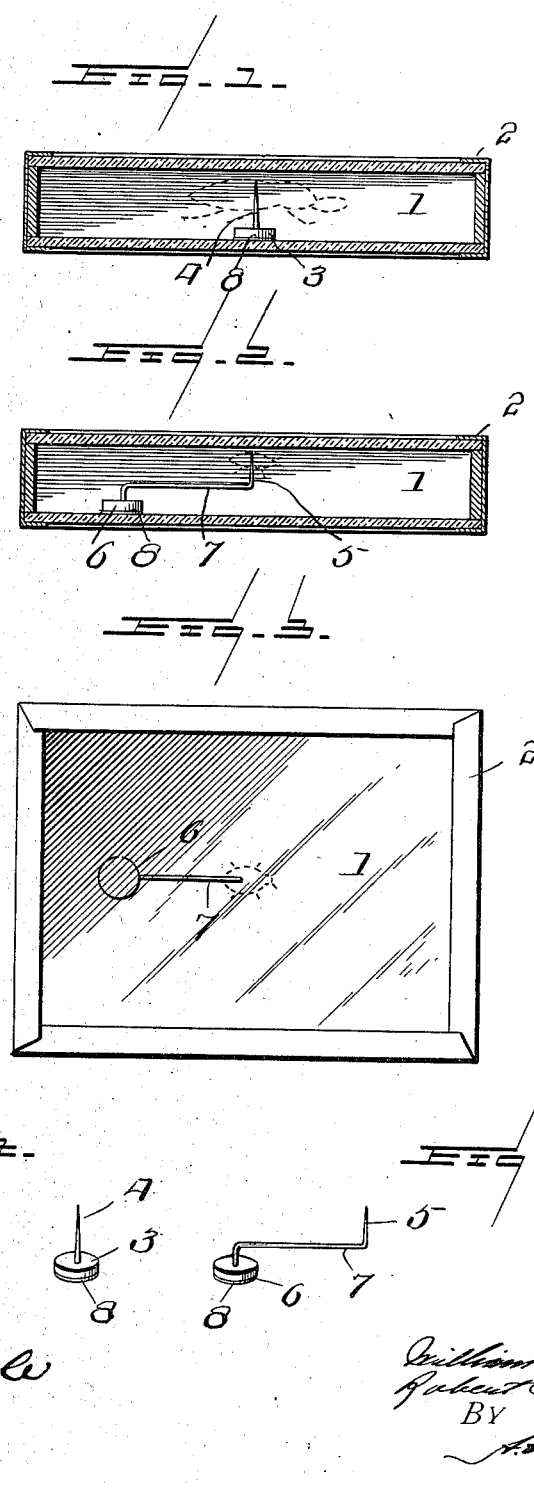
WITNESSES:
INVENTORS:
By
Attorney No. 735,475. Patented August 4, 1903.

UNITED STATES PATENT OFFICE.

WILLIAM DIXON DENTON AND ROBERT WINSFORD DENTON, OF WELLESLEY, MASSACHUSETTS.

MOUNT FOR ENTOMOLOGICAL, BOTANICAL, OR NATURAL-HISTORY SPECIMENS.

SPECIFICATION forming part of Letters Patent No. 735,475, dated August 4, 1903.

Application filed May 18, 1903. Serial No. 157,631. (No model.)

*To all whom it may concern:*

Be it known that we, WILLIAM DIXON DENTON and ROBERT WINSFORD DENTON, citizens of the United States, residing at Wellesley, in the county of Norfolk and State of Massachusetts, have invented certain new and useful Improvements in Mounts for Entomological, Botanical, or Natural-History Specimens; and we do hereby declare the following to be a full, clear, and exact description of the invention, such as will enable others skilled in the art to which it appertains to make and use the same.

In the mounting of entomological, botanical, and other natural-history specimens for display and study it is essential that the mount be of such construction as to inclose and protect the specimen from the disfiguring effects of dust and the attacks of insects or pests; that it be so made as to permit the collector to readily mount the object within the inclosing case or boxing; that when mounted it shall be so held as to effectively display its beauties and admit of ready and complete inspection for the purpose of studying its make-up, and that its mounting within the case be such as will, so far as possible, guard the specimen from breakage in event of falls or rough handling of the mount. It has been proposed heretofore to mount such specimens within a boxing having one or more transparent sides, so as to allow full and careful inspection of the same, and to hermetically seal such inclosing boxing to protect the specimen from dust and insects. Various means for supporting the specimen within the case or boxing, so as to display the same and protect it from injurious shocks, have been adopted, one method being that of using backings or tablets of various materials upon which the specimen is placed and between which and the transparent cover the specimen is held. Another method contemplates the placing of the extended parts, as the wings, of the specimen between transparent shelves and holding it suspended within the boxing. Still another way of supporting the specimen is that shown by McGlashan in his Patent No. 380,762, dated April 10, 1888, in which a standard is placed within the mount and the specimen is supported thereby, being held in place by a pin which is thrust through the body of the specimen and stuck into the standard. This is the prior art as known to us, and it is with the object of improving on the methods heretofore in use and producing a mount which shall meet the requirements for a practical mount as enumerated above that we have devised the present construction.

That the invention may be better understood we have illustrated in the drawings herewith one embodiment of our invention, and reference will be made to said drawings in the detailed description which follows, like parts being indicated by like characters in the several views.

In the drawings, Figure 1 is a longitudinal section of a mount embodying our invention. Fig. 2 is a view similar to Fig. 1 of a mount having a slightly different form of support. Fig. 3 is a bottom view of the mount shown in Fig. 2. Figs. 4 and 5 are detailed views of the supports shown in Figs. 1 and 2, respectively.

1 denotes the inclosing boxing, which is shown as rectangular in shape, although any desired form of boxing may be used, its top and bottom being shown as of transparent material, preferably glass, while its sides are formed of opaque material, preferably cardboard, although it is obvious that the boxing may, if desired, be made entirely of glass. The boxing is made up by means of passepartout stripping 2, which is pasted along the edges of the boxing, securing the parts together and sealing the boxing against the ingress of dust or insects. It is customary to leave the top plate unsecured at three sides and hinge it by means of the stripping, so that it may be readily turned back to allow the specimen to be placed within the boxing, after which the plate will be closed and the loose flaps of gummed stripping pasted down upon it.

Within the inclosing boxing is placed a specimen-support, which comprises a base 3, of relatively thin material coated with a suitable adhesive by which the support may be secured in any desired position upon the bottom plate, and an impaling-prong 4, which in the form shown in Fig. 1 is straight and formed of a slender gradually-tapered pin, said pin being made of any suitable material, preferably spring-steel, so as to have some elasticity. The impaling-prong 4 rises from the base 3 nearly to the top plate of the mount, so that when the mount is made up and the top plate is closed danger of displacement of the specimen is obviated, as such specimen cannot rise far enough on the impaling-pin to slip off the same without coming in contact with the top plate and being stopped thereby. It will be seen that when once the specimen is in position and the mount is sealed displacement of the specimen is impossible, so that danger of having to open and destroy the mount to remount the specimen on its support is done away with. It will be seen that the thin base of the support but slightly obscures the specimen and that it may be readily inspected and studied from beneath by holding the mount at an angle, the specimen being held clear of the base upon the impaling-prong. The prong being gradually tapered permits specimens of different thicknesses to be readily mounted, the thicker insects or specimens being pressed down until brought to the proper level relative to the top plate of the boxing, while the thinner specimens will be supported higher up on the prong, thus giving a collection of specimens a uniformity of appearance which is highly pleasing, the gradually-tapered prong obviating all danger of splitting the body of the insect or specimen as it is forced down upon it.

In the form of the support shown in Figs. 2, 3, and 5 the point 5 of the impaling-prong is offset from the base in order that the base 6 may not interfere at all with inspection of the under side of the specimen, this being a construction which is valuable in the mounting of the smaller insects. The horizontal arm 7, which connects the vertical part of the pin which projects from the base 6 and the point 5, adds materially to the elastic action of the support, having a springy action when the mount is subjected to falls or blows and absorbing the shock that would otherwise be imparted to the specimen.

The supports may be made either with the base-pieces integral with the impaling-prong or they may be made separate therefrom, as shown, and for facilitating setting the supports within the boxing each base will be coated with an adhesive, as 8, Figs. 4 and 5, which may be readily softened, so that a collector may position his support within the boxing as fancy or the shape and dimensions of the specimens may dictate, it being proposed to sell the mounts either with the supports fixed in position or loose within the boxing to be set up by the collector.

From the foregoing it will be seen that a mount is provided which meets the requirements of a practical mount, permitting, as it does, the most inexperienced collector to quickly and readily mount his specimens in display position, affording a mount in which the obscuring of the parts of the specimen is reduced to a minimum and giving a construction which will elastically support the specimen and guard it from shock.

It being apparent that the construction shown and described may be varied to some extent from the details herein set forth, we do not wish to be understood as limiting ourselves to anything shown and described except so far as we are limited by the terms of the appended claims.

We claim as our invention—

1. A mount for entomological, botanical, and natural-history specimens, comprising a boxing having one or more transparent sides, and a specimen-support within said boxing having a relatively thin base and a fixed impaling-prong projecting therefrom and adapted to receive a specimen upon its point.

2. A mount for entomological, botanical, and natural-history specimens, comprising a boxing having one or more transparent sides, and a specimen-support within said boxing having a relatively thin base and a fixed elastic impaling-prong projecting therefrom and adapted to receive a specimen upon its point.

3. A mount for entomological, botanical, and natural-history specimens, comprising a boxing having one or more transparent sides, and a specimen-support within said boxing having a relatively thin base and a fixed impaling-prong of spring material projecting from said base and extending to within close proximity to the opposite side of the boxing and adapted to receive a specimen upon its point.

4. A mount for entomological, botanical, and natural-history specimens, comprising a boxing having one or more transparent sides, and a fixed specimen-support within said boxing having a relatively thin base and an offset impaling-prong carried by said base.

5. A mount for entomological, botanical, and natural-history specimens, comprising a boxing having one or more transparent sides, and a fixed specimen-support within said boxing having a relatively thin base and an impaling-prong having a horizontal arm to offset it from said base carried thereby.

6. A mount for entomological, botanical, and natural-history specimens, comprising a boxing having one or more transparent sides, and a fixed specimen-support within said boxing having a relatively thin base and an offset elastic impaling-prong carried by said base.

7. A mount for entomological, botanical, and natural-history specimens, comprising a boxing having one or more transparent sides, and a fixed specimen-support within said boxing having a relatively thin base and an elastic impaling-prong having a horizontal arm to offset it from said base carried thereby.

8. A specimen-support for mounting natural-history specimens having a relatively thin base and a slender tapering impaling-prong projecting from said base and adapted to receive a specimen upon its point.

9. A specimen-support for mounting natural-history specimens having a relatively thin base and a slender tapering impaling-prong of spring material projecting from said base adapted to receive a specimen upon its point.

10. A specimen-support for mounting natural-history specimens, comprising a base and an impaling-prong carried thereby and having its point offset relative to said base.

11. A specimen-support for mounting natural-history specimens having a relatively thin base and a slender tapering impaling-prong carried by said base and having its point offset relative to said base.

12. A specimen-support for mounting natural-history specimens having a relatively thin base and a slender tapering impaling-prong of spring material carried by said base and having its point offset relative to said base.

13. As a new article of manufacture, a specimen-support for mounting natural-history specimens, having a base, an impaling-prong projecting from said base, and an adhesive coating on the under side of said base.

In testimony whereof we affix our signatures in presence of two witnesses.

WILLIAM DIXON DENTON.
ROBERT WINSFORD DENTON.

Witnesses:
HANNA S. WISWALL,
EDWARD H. WISWALL.